(12) United States Patent
Toledano et al.

(10) Patent No.: US 10,171,226 B2
(45) Date of Patent: Jan. 1, 2019

(54) SYSTEMS AND METHODS FOR FREQUENCY DIVISION DUPLEX COMMUNICATION

(71) Applicant: TCL Communication Limited, Kowloon (HK)

(72) Inventors: Ron Toledano, Colombes (FR); Olivier Marco, Colombes (FR); Benny Assouline, Colombes (FR); Efstathios Katranaras, Colombes (FR)

(73) Assignee: TCL COMMUNICATION LIMITED, Kowloon (HK)

( * ) Notice: Subject to any disclaimer, the term of this patent is extended or adjusted under 35 U.S.C. 154(b) by 0 days.

(21) Appl. No.: 15/666,400

(22) Filed: Aug. 1, 2017

(65) Prior Publication Data

US 2018/0097606 A1    Apr. 5, 2018

(30) Foreign Application Priority Data

Sep. 30, 2016 (GB) .................................. 1616610.0

(51) Int. Cl.
| | | |
|---|---|---|
| *H04L 5/14* | (2006.01) | |
| *H04L 1/18* | (2006.01) | |
| *H04W 72/04* | (2009.01) | |
| *H04L 5/00* | (2006.01) | |

(Continued)

(52) U.S. Cl.
CPC .............. *H04L 5/14* (2013.01); *H04L 1/1854* (2013.01); *H04L 1/1861* (2013.01); *H04L 5/0055* (2013.01); *H04W 72/042* (2013.01); *H04L 1/1614* (2013.01); *H04L 1/1822* (2013.01); *H04L 5/0053* (2013.01); *H04L 5/16* (2013.01)

(58) Field of Classification Search
CPC ....... H04L 5/14; H04L 5/0055; H04L 1/1854; H04L 1/1861; H04L 5/16; H04L 5/0053; H04L 1/1614; H04L 1/1822; H04W 72/042

See application file for complete search history.

(56) References Cited

U.S. PATENT DOCUMENTS

2013/0242824 A1* 9/2013 Lee ....................... H04L 1/1819
                                                                370/281

FOREIGN PATENT DOCUMENTS

| WO | 2015/171046 A1 | 11/2015 |
|---|---|---|
| WO | 2015/172041 A1 | 11/2015 |

(Continued)

OTHER PUBLICATIONS

ZTE, "Support of HARQ-ACK bundling for MTC," 3GPP TSG RAN WG1 Meeting #86, R1-167318, Gothenburg, Sweden, Aug. 22-26, 2016, XP51125837.

(Continued)

*Primary Examiner* — Afshawn M Towfighi
(74) *Attorney, Agent, or Firm* — Baker Hostetler LLP (57) ABSTRACT

A method of wireless communication using half duplex frequency division duplex (HD-FDD) comprises, at a wireless communications device, receiving downlink data during a plurality of downlink subframes and transmitting a hybrid automatic repeat request acknowledgement (HARQ-ACK) on an uplink. The HARQ-ACK relates to downlink data received during at least two of the plurality of downlink subframes and the HARQ-ACK is transmitted during one uplink subframe.

12 Claims, 8 Drawing Sheets

(51) Int. Cl.
*H04L 1/16* (2006.01)
*H04L 5/16* (2006.01)

(56) References Cited

FOREIGN PATENT DOCUMENTS

WO    2016/013148 A1    1/2016
WO    2017/105538 A1    6/2017

OTHER PUBLICATIONS

Sony, "Higher data rate for feMTC," 3GPP TSG RAN WG1 Meeting #86, R1-166660, Gothenburg, Sweden, Aug. 22-26, 2016, XP51125496.
Qualcomm Incorporated, "Support of HARQ-ACK bundling in HD-FDD," 3GPP TSG RAN WG1 Meeting #86, Gothenburg, Sweden, R1-166296, Aug. 26, 2016.
Sierra Wireless: "Ack Bundling Design Considerations," 3GPP Draft; R1-166680, 3rd Generation Partnership Project (3GPP), vol. RAN WG1, Gothenburg, Sweden, Aug. 13, 2016, pp. 20160822-20160826, XP051132858.
Sierra Wireless: "M-PDCCH and HARQ Options for HD-FDD in Normal Coverage," 3GPP Draft; R1-153111, 3rd Generation Partnership Project (3GPP), vol. RAN WG1, Fukuoka, May 24, 2015, pp. 20150525-20150529, XP050971016.

* cited by examiner

| Higher layer parameter 'maxHARQ-Rx' | M | DL HARQ process number $n_{HARQ\_ID}$ | | | | | | | | | |
|---|---|---|---|---|---|---|---|---|---|---|---|
| | | 0 | 1 | 2 | 3 | 4 | 5 | 6 | 7 | 8 | 9 |
| 3 | 1 | 4 | 4 | 4 | - | - | - | - | - | - | - |
| 4 | 2 | 5 | 4 | 5 | 4 | - | - | - | - | - | - |
| 6 | 4 | 7 | 6 | 6 | 5 | 5 | 4 | - | - | - | - |
| 8 | 4 | 9 | 8 | 8 | 7 | 7 | 6 | 6 | 5 | - | - |
| 10 | 8 | 11 | 10 | 9 | 8 | 8 | 7 | 6 | 5 | 5 | 4 |

Fig. 5

| Higher layer parameter 'maxHARQ-Rx' | M | DL HARQ process number | | | | | | | | | |
|---|---|---|---|---|---|---|---|---|---|---|---|
| | | 0 | 1 | 2 | 3 | 4 | 5 | 6 | 7 | 8 | 9 |
| 3 | 1 | 4 | 4 | 4 | - | - | - | - | - | - | - |
| 4 | 2 | 5 | 4 | 5 | 4 | - | - | - | - | - | - |
| 6 | 4 | 5 | 4 | 5 | 4 | 5 | 4 | - | - | - | - |
| 8 | 4 | 6 | 5 | 6 | 5 | 6 | 5 | 6 | 5 | - | - |
| 10 | 8 | 9 | 8 | 7 | 6 | 7 | 6 | 5 | 4 | 5 | 4 |

Fig. 6

| value | delayed grant Y/N | HARQ-ACK Timing adjustment δ | Scheduling delay d |
|---|---|---|---|
| '00' | N | 0 | 0 |
| '01' | N | -1 | 0 |
| '10' | N | +1 | 0 |
| '11' | Y | N/A | 5 |

Fig. 7

| Higher layer parameter 'maxHARQ-Rx' | HARQ-ACK delay value | | | |
|---|---|---|---|---|
| | '00' | '01' | '10' | '11' |
| 3 | - | - | - | - |
| 4 | 4 | 5 | - | - |
| 6 | 4 | 5 | 6 | 7 |
| 8 | 7 | 6 | 5 | 4 |
| 10 | 11 | 8 | 5 | 4 |

Fig. 13 - maxHARQ-rx = 3 (DL 300kbps, baseline)

Fig. 12

Fig. 14 - maxHARQ-rx = 4 (DL 363 kbps)

Fig. 15 - maxHARQ-rx = 6 (DL 461 kbps)

Fig. 16 - maxHARQ-rx = 8 (DL 500kbps)

Fig. 17 - maxHARQ-rx = 10 (DL 588 kbps)

Fig. 18 - maxHARQ-rx = 6 + delayed DL grant (DL 444 kbps)

Fig. 19 - maxHARQ-rx = 8 + delayed DL grant (DL 545 kbps)

Fig. 20 - maxHARQ-rx = 10 + delayed DL grant (DL 600 kbps)

SYSTEMS AND METHODS FOR FREQUENCY DIVISION DUPLEX COMMUNICATION

CROSS-REFERENCE TO RELATED APPLICATIONS

This application claims priority to foreign Great Britain patent application No. GB 1616610.0, filed on Sep. 30, 2016, the disclosure of which is incorporated by reference in its entirety.

TECHNICAL FIELD

The present disclosure relates to Frequency Division Duplex (FDD) communication.

BACKGROUND

Figure 1:
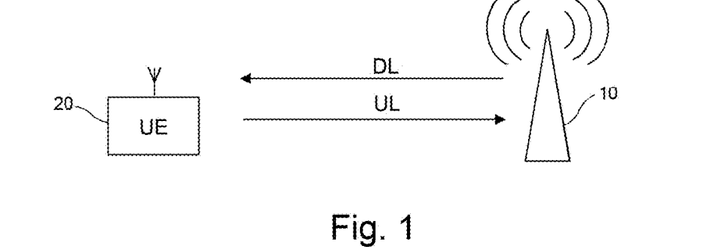
FIG. 1 shows a wireless communication system with a downlink and uplink communications.

Long-Term Evolution (LTE) is a wireless communication technology developed by the 3rd Generation Partnership Project (3GPP). LTE defines Time Division Duplex (TDD) and Frequency Division Duplex (FDD) modes of operation. LTE also defines two modes of FDD operation: full duplex FDD and Half Duplex FDD (HD-FDD). Communication between a wireless base station 10 and a user equipment (UE) 20 comprises downlink (DL) transmissions from the base station to the UE and uplink (UL) transmissions from the UE to the base station.

Figure 2:
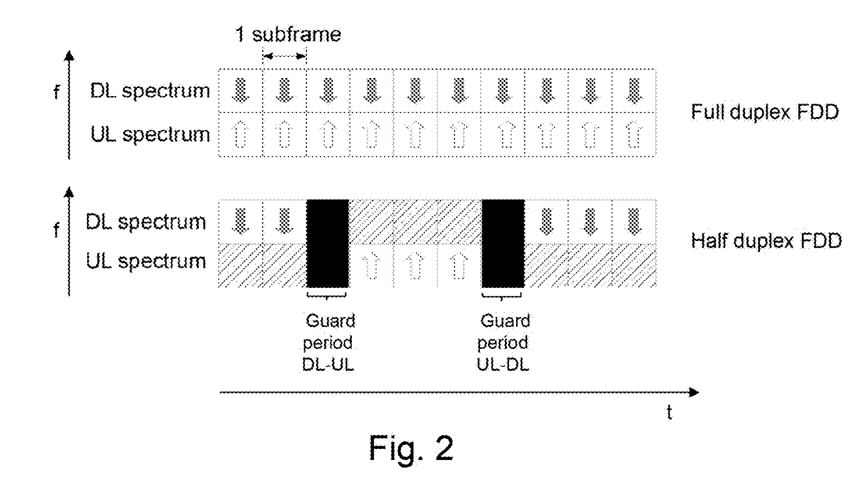
FIG. 2 shows full duplex FDD and half duplex FDD modes.

FIG. 2 schematically shows Full duplex FDD and half duplex FDD. In each case there are separate spectral resources for DL and UL communication. In full duplex FDD mode a user equipment (UE) can simultaneously transmit and receive using the separate DL and UL resources. In half-duplex FDD mode, the UE cannot receive and transmit simultaneously at a given time. The time axis is divided into frames and subframes. During each subframe the UE may receive on the DL or transmit on the UL.

HD-FDD is suited to low-complexity UEs. Because in HD-FDD mode a UE is not expected to transmit and receive simultaneously, the UE may only be capable of tuning to one frequency band at a time. For example, a transceiver of the UE may only have a single local-oscillator (LO). Re-tuning the LO between DL spectrum and UL spectrum takes some time, and during this re-tuning period the transceiver is not available for DL reception or UL transmission. A half duplex FDD scheme may use a guard period to allow a UE to switch retune between a downlink and an uplink. In LTE the terminology for HD-FDD implemented with a single LO is known as HD-FDD type B. In LTE HD-FDD Type B a re-tuning gap of one subframe is provided. This is called a guard subframe. FIG. 2 shows a guard subframe for a DL-UL switch and a guard subframe for an UL-DL switch.

There are some further constraints on the achievable downlink data rate in half duplex operation. One constraint is that the UE needs to switch to transmit on the uplink to confirm whether or not it correctly received data on the downlink. In LTE this mechanism is a Hybrid Automatic Repeat Request (HARQ) mechanism. The UE transmits a single HARQ-ACK per downlink transmission. The HARQ-ACK indicates if the downlink transmission was correctly received (ACK) or if the downlink transmission was incorrectly received (NACK). There is a fixed timing relationship between the downlink transmission and the HARQ-ACK reply from the UE.

Another constraint is that a UE receives a control message which schedules a downlink data transmission before receiving the downlink data transmission. Both the control message and the downlink data transmission occur within a group of downlink subframes before the UE switches to an uplink. This can leave unused periods within a group of downlink subframes.

The examples described below are not limited to implementations which solve any or all of the disadvantages of known systems.

SUMMARY

There is provided a method of wireless communication using half duplex frequency division duplex (HD-FDD) comprising, at a wireless communications device: receiving downlink data during a plurality of downlink subframes; and transmitting a hybrid automatic repeat request acknowledgement (HARQ-ACK) on an uplink. The HARQ-ACK relates to downlink data received during at least two of the plurality of downlink subframes and the HARQ-ACK is transmitted during one uplink subframe.

A timing association between a downlink data subframe and an uplink transmission subframe for transmitting the HARQ-ACK may be non-uniform for different downlink data subframes.

Each downlink subframe carrying downlink data may be associated with an HARQ process number. The wireless communications device may store timing data which indicates a timing association between an HARQ process number of the downlink data and an uplink transmission subframe for transmitting the HARQ-ACK.

The timing data may be dependent on at least one of: a number of HARQ processes; a number of downlink data subframes that a HARQ-ACK relates to.

The number of HARQ processes in a transmission cycle may be selected from at least one of: 3, 4, 6, 8, 10.

The wireless communications device may receive timing data on a downlink channel which indicates a timing association between a downlink data subframe and an uplink transmission subframe for transmitting the HARQ-ACK.

The timing data may be received as part of a downlink channel indicator (DCI).

Downlink subframes and uplink subframes may be separated by a guard period and the method determines a timing of a guard period for a downlink-to-uplink switch by at least one of: determining if the timing data indicates that the wireless communications device should transmit a HARQ-ACK in a subsequent subframe; determining if the timing data indicates that the wireless communications device is not expected to transmit data on the uplink.

Uplink subframes and downlink subframes may be separated by a guard period and the method determines a timing of a guard period for an uplink-to-downlink switch by at least one of: determining if the timing data indicates that the wireless communications device is not expected to transmit a HARQ-ACK on the uplink; determining if the timing data indicates that the wireless communications device is not expected to transmit data on the uplink.

The HARQ-ACK may comprise an HARQ ACK/NACK indication per HARQ process.

The HARQ-ACK may comprise a single HARQ ACK/NACK indication for the plurality of HARQ processes.

There is provided a method of wireless communication in a system with a half duplex frequency division duplexed (HD-FDD) downlink and uplink, the method comprising at a wireless communications device: receiving a scheduling indication of a scheduled downlink data transmission; receiving downlink data during a downlink subframe;

wherein the scheduling indication is received before a guard period for a downlink-to-uplink switch and the downlink data is received after a guard period for an uplink-to-downlink switch.

The method may comprise receiving an indication on a downlink channel of whether a scheduled downlink data transmission will be delayed until after a guard period for an uplink-to-downlink switch.

There may be a first fixed value of scheduling delay between receiving a scheduling indication and receiving a downlink data transmission when a scheduled downlink data transmission will not be delayed until after a guard period for an uplink-to-downlink switch; and there may be a second fixed value of scheduling delay between receiving a scheduling indication and receiving a downlink data transmission when a scheduled downlink data transmission will be delayed until after a guard period for an uplink-to-downlink switch; and the method may comprise using the indication of whether a scheduled downlink data transmission will be delayed to determine the scheduling delay.

The indication of whether a scheduled downlink data transmission will be delayed may be received as a 1-bit parameter.

The indication of whether a scheduled downlink data transmission will be delayed may be received as part of a multi-bit parameter which also indicates a timing association between a downlink data subframe and an uplink transmission subframe for transmitting a hybrid automatic repeat request acknowledgement, HARQ-ACK.

The method may comprise: determining a timing of a first guard period for a downlink-to-uplink switch; determining a timing of a second guard period for an uplink-to-downlink switch; determining a timing of the scheduling indication relative to the determined timing of the first guard period; and if the timing of the scheduling indication relative to the determined timing of the first guard period is within a threshold value: determining a transmission time for a delayed scheduled downlink data transmission relative to the second guard period.

The method may comprise determining a timing of a guard period for a downlink-to-uplink switch by: determining if the timing data indicates that the wireless communications device should transmit a HARQ-ACK in a subsequent subframe; determining if the timing data indicates that the wireless communications device is not expected to transmit data on the uplink.

There is provided a user equipment apparatus configured to perform the method as described or claimed.

Functionality described in this disclosure are applicable to, but not limited to, bandwidth reduced low complexity UEs (BL), or UEs in enhanced coverage (CE). Functionality described in this disclosure is applicable to, but not limited to, Machine Type Communications (MTC).

The methods may be applied to a HD-FDD technology such as LTE HD-FDD Type B.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Examples of the invention will be described, by way of example, with reference to the following drawings, in which.

DETAILED DESCRIPTION

Examples of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

Referring again to FIG. 2, an FDD communications system provides separate spectral resources for DL and UL communication. The spectral resources may comprise a set of frequency subcarriers. The time axis is divided into frames and subframes. In LTE system, a frame comprises 10 subframes numbered #0-#9. In half-duplex FDD mode, during each subframe the UE may receive on the DL or transmit on the UL. A UE may also require time to switch between monitoring the DL and transmitting on the UL. A guard period is provided for the switching. In LTE, Type B HD-FDD, a guard subframe is provided for a DL-UL switch and a guard subframe is provided for an UL-DL switch.

HARQ-ACK Bundling

Figure 3:
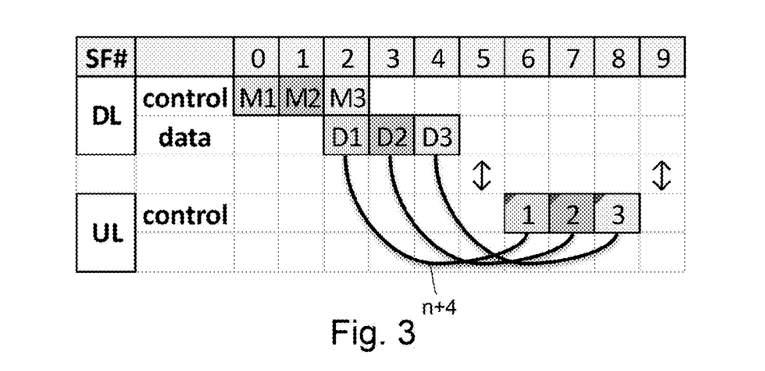
FIG. 3 shows an example of a scheduling pattern and HARQ-ACK responses already supported by the LTE specification.

For purposes of background explanation, FIG. 3 schematically shows a conventional example of HD-FDD communication. Communication on the downlink comprises control and data. The UE receives scheduling control messages M1, M2, M3 which schedule downlink data transmissions D1, D2, D3 on the data channel(s). Each of the scheduling control messages M1, M2, M3 precedes the downlink data transmission D1, D2, D3 to which it relates, e.g. M1 precedes D1. The UE sends a separate HARQ-ACK message on a control channel of the uplink for each of the downlink data transmissions D1, D2, D3. For example, UL message 1 relates to downlink data transmission D1, and so on. There is a fixed timing relationship between the downlink data transmission and the HARQ-ACK. In this example, the timing relationship between the downlink data transmission in subframe n and the associated HARQ-ACK reply is n+4, i.e. 4 subframes. The UL HARQ-ACK message 1 is transmitted 4 subframes after D1, UL HARQ-ACK message 2 is transmitted 4 subframes after D2, and so on.

Figure 4:
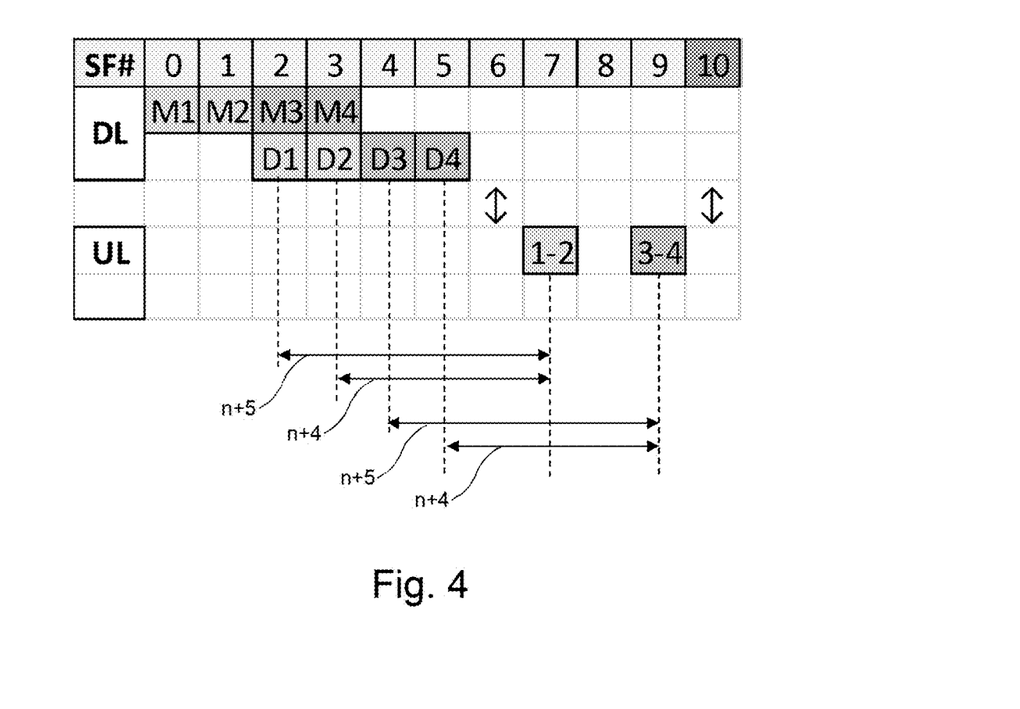
FIG. 4 shows an example of a scheduling pattern with bundled HARQ-ACK responses.

FIG. 4 shows an example of a modified HD-FDD communication. In this example there is a non-uniform timing relationship between downlink data transmissions and HARQ-ACKs. Similar to FIG. 3, communication on the downlink comprises control and data. The UE receives scheduling control messages M1, M2, M3, M4 which schedule downlink data transmissions D1, D2, D3, D4 on the data channel(s). Each of the scheduling control messages M1, M2, M3, M4 precedes the downlink data transmission D1, D2, D3, D4 to which it relates, e.g. M1 precedes D1. Each of the downlink data transmissions D1, D2, D3, D4 is associated with an HARQ process number. The UE sends a HARQ-ACK acknowledgement on a control channel of the uplink for each of the downlink data transmissions D1, D2, D3, D4. The UE combines multiple HARQ-ACKs into a single uplink response sent during a single uplink subframe. For example, UL acknowledgement message 1-2 relates to downlink data transmissions D1 and D2. UL acknowledgement message 3-4 relates to downlink data transmissions D3 and D4. This will be called HARQ-ACK "bundling". The HARQ-ACK may be transmitted as Uplink Control Information (UCI). The HARQ-ACK may be transmitted on a Physical Uplink Shared Channel (PUSCH) or a Physical Uplink Control Channel (PUCCH). Scheduling control messages are received on a Physical Downlink Control Channel for bandwidth reduced low complexity UEs or UEs in enhanced coverage (MPDCCH). Data subframes are received on a Physical Downlink Shared Channel (PDSCH).

HARQ-ACK Timing

The timing relationship between the downlink data subframe and the HARQ-ACK is no longer a constant value for each downlink data subframe/HARQ-ACK pairing. For D1, the timing relationship between the downlink data subframe D1 in subframe n and the HARQ-ACK 1-2 is n+5, i.e. 5 subframes. For D2, the timing relationship between the downlink data subframe D2 and the HARQ-ACK 1-2 is n+4, i.e. 4 subframes. This combining of HARQ-ACK responses can reduce the amount of control information (e.g. UCI) transmitted on the uplink. The non-uniform timing can allow an increase of the duration of the period before the UE is switched to the uplink, thereby allowing a higher percentage of time for downlink data transmission.

There are several possible ways of determining a timing relationship between a downlink data subframe and a subframe to transmit the HARQ-ACK for that downlink data subframe.

Figure 5:
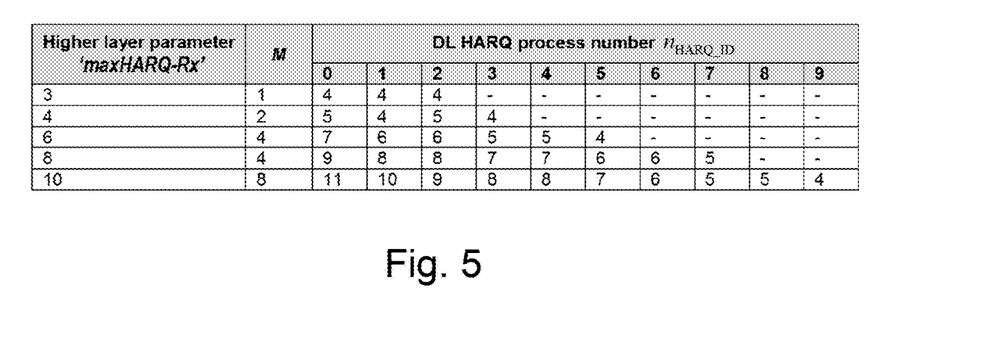
FIGS. 5 to 8 show example tables of timing data.

A first way of determining a timing relationship between a downlink data subframe and a subframe to transmit the HARQ-ACK for that downlink data subframe is based on the HARQ process number of the downlink data subframe and stored timing data, such as a look-up table (LUT). In the table shown in FIG. 5: maxHARQ-Rx is the number of HARQ processes in a transmission cycle; M is the number of downlink subframes (HARQ processes) associated with a HARQ-ACK response message, i.e. the number of downlink HARQ-ACK responses bundled together. The table provides a timing association, in terms of a number of subframes (k), corresponding to a DL HARQ process number. In the example shown in FIG. 4, maxHARQ-Rx=4 (there are four HARQ processes in a transmission cycle) and M=2 (each HARQ response carries an acknowledgement for two data transmissions). The second row of the table provides the timing association. For simplicity, it is assumed that D1 corresponds to DL HARQ process number 0, D2 corresponds to DL HARQ process number 1 and so on, but other relationships are possible. Looking up these values in the table, the HARQ-ACK reply for DL HARQ process number 0 (=D1) has an offset of 5 subframes, the HARQ-ACK reply for DL HARQ process number 1 (=D2) has an offset of 4 subframes.

Stated More Formally, the Method Comprises:

upon detection of a PDSCH with HARQ process number(s) $n_{HARQ\_ID}$ within subframe(s) n-k intended for the UE and for which a HARQ-ACK shall be provided; or upon detection of a MPDCCH indicating downlink Semi-Persistent Scheduling (SPS) release for SPS associated with process number(s) $n_{HARQ\_ID}$ within subframe(s) n-k intended for the UE and for which a HARQ-ACK shall be provided.

The UE transmits the HARQ-ACK response in subframe n using $n_{PUCCH}^{(1,\tilde{p})}$ as described below. The value of k is given by the table in FIG. 5. The value of $n_{HARQ\_ID}$ is determined according to the HARQ process number field in DCI format 6-1A or associated with the SPS.

A second way of determining a timing relationship between a downlink data subframe and a subframe to transmit the HARQ-ACK for that downlink data subframe is based on HARQ process number and stored timing data, such as a look-up table (LUT), similar to the first method above. Additionally, the HARQ-ACK timing can be adjusted dynamically by control information. For example, control information may be received on a downlink control channel with a scheduling message. One example of implementing this is to add a 2-bit field to a downlink control information message (DCI), which will be called scheduling and HARQ-ACK delay in this disclosure. Any other suitable term can be used. Stated more formally, the method comprises:

upon detection of a PDSCH with HARQ process number(s) $n_{HARQ\_ID}$ within subframe(s) n-k+δ intended for the UE and for which a HARQ-ACK shall be provided; or upon detection of a MPDCCH indicating downlink SPS release for SPS associated with process number(s) $n_{HARQ\_ID}$ within subframe(s) n-k+δ intended for the UE and for which a HARQ-ACK shall be provided.

The UE shall transmit the HARQ-ACK response in subframe n using $n_{PUCCH}^{(1,\tilde{p})}$ as described below. The value of k is given by the table in FIG. 6. The value of the parameter δ is determined using the table shown in FIG. 7. The table of FIG. 7 maps a 2-bit value "00", "01", "10" to a timing adjustment. Essentially, this fine-tunes the calculation provided by the table of FIG. 6. This method allows some additional flexibility in scheduling.

A third way of determining a timing relationship between a downlink data subframe and a subframe to transmit the HARQ-ACK for that downlink data subframe is based on an explicit value received on a downlink control channel. For example, control information may be received on a downlink control channel with a scheduling message. One example way of implementing this is by a 2-bit field in a downlink control information message (DCI), referred to as HARQ-ACK delay field. Stated more formally, the method comprises:

upon detection of a PDSCH within subframe(s) n-k intended for the UE and for which a HARQ-ACK shall be provided; or upon detection of a MPDCCH indicating downlink SPS release within subframe(s) n-k intended for the UE and for which a HARQ-ACK shall be provided.

Figure 8:
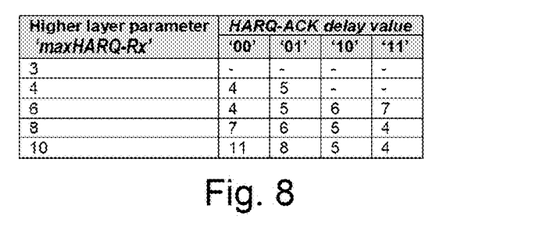

The UE shall transmit the HARQ-ACK response in subframe n using $n_{PUCCH}^{(1,\tilde{p})}$ as described below, where the parameter k is determined using the table in FIG. 8. This method allows flexibility in scheduling.

Figure 9:
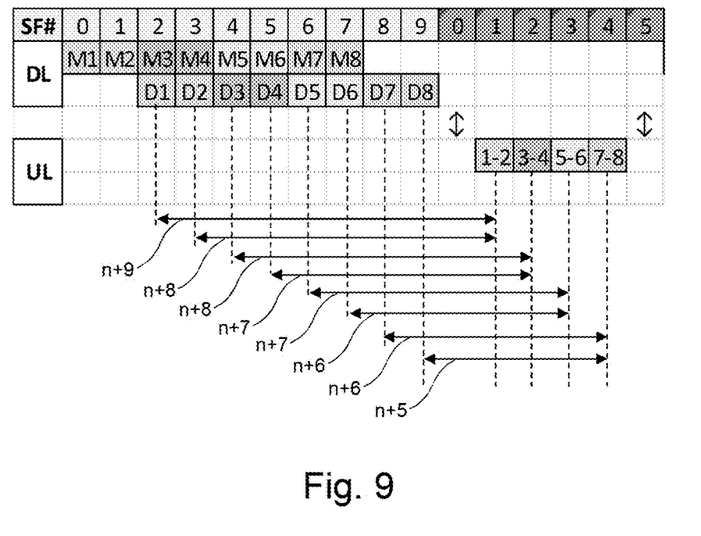
FIG. 9 shows another example of a scheduling pattern with bundled HARQ-ACK responses.

FIG. 9 shows another example of a modified HD-FDD communication. Similar to FIG. 4, there is a non-uniform timing relationship between downlink data subframes and uplink acknowledgements. In this example the transmission cycle comprises 8 scheduling control messages M1-M8 which schedule downlink data transmissions D1-D8 on the data channel(s). Each of the scheduling control messages M1-M8 precedes the downlink data transmission D1-D8 to which it relates. The UE sends a HARQ-ACK acknowledgement on a control channel of the uplink for each of the downlink data transmissions D1-D8. The UE combines multiple acknowledgements into a single uplink response. UL acknowledgement message 1-2 relates to downlink data transmissions D1 and D2; UL acknowledgement message 3-4 relates to downlink data transmissions D3 and D4 and so on. This is another example of HARQ-ACK bundling. The timing relationship between the downlink data transmission and the HARQ-ACK is non-uniform. For D1, the timing relationship between the downlink data transmission D1 and the HARQ-ACK 1-2 is n+9, i.e. 9 subframes. For D2, the timing relationship between the downlink data transmission D2 and the HARQ-ACK 1-2 is n+8, i.e. 8 subframes.

One HARQ-ACK is sent in a single UL subframe. The HARQ-ACK may comprise an HARQ ACK/NACK indication per HARQ process/DL subframe, or the HARQ-ACK may comprise a single HARQ ACK/NACK indication for the plurality of HARQ processes/DL subframes. In an example, the HARQ-ACK can carry 1 or 2 bits of information. If the HARQ-ACK carries 1 bit of information and the HARQ-ACK relates to a bundle of two HARQ processes/DL subframes, the bit will represent an ACK or NACK value for the whole bundle of HARQ processes/DL subframes. For example: a value of "1" can indicate all DL transmissions were received OK (ACK); a value of "0" can indicate at least one of the DL transmissions was received with errors (NACK). In response to sending a 1-bit HARQ-ACK which indicates a NACK, the entire bundle of DL subframes are resent. If the HARQ-ACK carries 2 bits of information, and the bundle is two DL transmissions, then each of the bits can represent an ACK/NACK for that DL transmission, e.g. D1 is received OK and D2 is received with errors can be indicated by a 2-bit HARQ-ACK having the value "10". In response to sending a 1-bit HARQ-ACK which indicates a NACK, only the corrupted DL transmission is resent. If a 2-bit HARQ-ACK represents two DL transmissions, only the DL subframe received in error is resent. It will be understood that a different number of HARQ-ACK bits may be used and/or a different number of HARQ processes may be represented. For example, if the bundle is four DL transmissions then each of the bits of the HARQ-ACK can represent an ACK/NACK for two of the DL transmissions. If the HARQ-ACK is sent on PUCCH, the current formats are used—PUCCH format 1a to send 1-bit HARQ-ACK and PUCCH format 1b to send 2-bit HARQ-ACK.

It will be understood that, in some situations, the UE will only send a HARQ-ACK relating to one DL subframe. For example, this can occur if only one DL subframe is scheduled.

Guard Period Determination

Referring again to the example of FIG. 4, the UE switches between the DL and UL during subframe 6 and the UE switches between the UL and DL during subframe 10. There are various ways of defining the timing of the guard subframes. One possibility is that the UE can determine the timing of the guard subframes by reference to downlink transmissions and scheduled uplink transmissions. Referring again to the example of FIG. 4, the UE receives a scheduling control message M4 during subframe #3 which schedules a downlink data transmission D4 during subframe #5. The UE knows, from stored timing association data (e.g. FIG. 5) that it should transmit a HARQ-ACK reply on the UL during subframe #7. Therefore, the UE knows that it should switch from DL to the UL during subframe #6. Similarly, the UE knows, from stored timing association data (e.g. FIG. 5) that it should transmit a HARQ-ACK reply on the UL during subframe 9. The UE knows this is the last HARQ-ACK reply of the transmission cycle. Therefore, the UE knows that it should switch from UL to the DL during subframe #10.

The arrangement is resilient to errors. For example, referring again to FIG. 4, consider that scheduling control messages M1, M2 are not received by the UE and therefore the UE does not receive data transmissions D1, D2. Because D1 and D2 were not received, the UE does not need to transmit a HARQ-ACK in subframe #7. Therefore, the UE does not switch to the UL during a guard subframe at subframe #6. The UE does receive M3, M4 and D3, D4. The UE knows it has to transmit a HARQ-ACK 3-4 at subframe 9. Therefore, it switches to the UL during a guard subframe at subframe #8. In this example the UE recovers quickly from the error situation. The HARQ-ACK is still being sent with the correct timing.

For UE in a half-duplex FDD operation and that is configured with fdd-AckNackFeedbackMode set to 'bundling', and for determination of a guard-subframe, the timing of the guard subframe will be decided dynamically based on the HARQ process number of PDSCH transmission that was detected by the UE. Stated more formally, the method comprises:

subframe n is a guard-subframe for switching between DL to UL if a UE shall transmit a HARQ-ACK feedback or uplink data (PUSCH transmission) in subframe n+1.

subframe n is a guard-subframe for switching between UL to DL if no HARQ-ACK transmission or no PUSCH transmission is expected by the UE after that subframe.

Uplink transmission on the PUSCH may be initiated by the UE after receiving a MPDCCH scheduling message (UL grant), or based on Semi-Persistent Scheduling. In the case of MPDCCH scheduling, then if the UL grant is received in subframe n, the uplink transmission PUSCH will occur in subframe n+4. An uplink transmission during subrame n+4 can be either:

(a) a HARQ-ACK transmission following PDSCH in subframe n (or earlier than n with ACK bundling); or (b) an UL transmission on PUSCH following MPDCCH UL grant in SF n; or (c) UL transmission on PUSCH following SPS.

There are several ways of coping with error situations. For example, the UE is not expected to transmit HARQ-ACK if the timing association given by k+δ<4. In case of collision between HARQ-ACK and reception of PDSCH, the PDSCH will be dropped and UE shall transmit the HARQ-ACK.

PUCCH Resource Determination

The UE determines which uplink resource to use to send the HARQ-ACK. The relevant uplink channel is the Physical Uplink Control Channel (PUCCH). If the UE configured with higher-layer parameter fdd-AckNackFeedbackMode set to 'bundle' the UE shall use PUCCH resource $n_{PUCCH}^{(1,\tilde{p})}$ or transmission of HARQ-ACK in subframe n where, if there is a PDSCH transmission indicated by the detection of a corresponding MPDCCH, or for an MPDCCH indicating downlink SPS release within subframe(s) n-k, the UE shall use $n_{PUCCH}^{(1,\tilde{p})}$ based on the subframe with the smallest value of k such that HARQ-ACK is sent in subframe n as if there is no HARQ-ACK bundling.

Configuration

The HARQ-ACK bundling mode can be configured at the UE by a wireless base station (e.g. eNB) serving the UE. A suitable configuration parameter may be called fdd-AckNackFeedbackMode. The serving eNB may additionally configure the UE with a maximum number of DL HARQ processes by higher-layers. A suitable configuration parameter may be called maxHARQ-Rx, and may indicate a value between 3 and 10. As shown in FIGS. 13 to 20, different bundling schemes may use different maximum number of HARQ processes.

It is possible to apply HARQ-ACK bundling to LTE HD-FDD Type A. LTE HD-FDD Type A has a shortened guard period for a downlink-to-uplink switch and no guard period for an uplink-to-downlink switch. The UE may still determine when to perform a downlink-to-uplink switch and when to perform a downlink-to-uplink switch, without requiring a guard period between uplink and downlink subframes.

Delayed DL Grant

Figure 10:
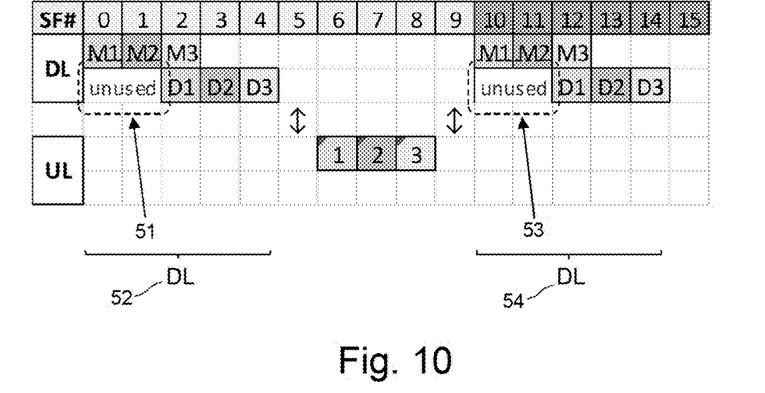
FIG. 10 shows an example of a scheduling pattern and HARQ-ACK responses already supported by the LTE specification.

For purposes of background explanation, FIG. 10 schematically shows a conventional example of HD-FDD communication. Communication on the downlink comprises control and data. The UE receives scheduling control messages M1, M2, M3 which schedule downlink data transmissions D1, D2, D3 on the data channel(s). Each of the scheduling control messages M1, M2, M3 precedes the downlink data transmission D1, D2, D3 to which it relates, e.g. M1 precedes D1. The UE sends separate HARQ-ACK messages on a control channel of the uplink for each of the downlink data transmissions D1, D2, D3. A scheduling control message M1, M2, M3 and the downlink data transmission D1, D2, D3 to which the scheduling message relates both occur within the same group of downlink transmission subframes, before a DL-UL guard subframe. For example, each of a first group of the scheduling control messages M1, M2, M3 and the downlink data transmissions D1, D2, D3 occur within the same group of downlink transmission subframes 52. Similarly, each of a second group of the scheduling control messages M1, M2, M3 and the downlink data transmissions D1, D2, D3 occur within the same group of downlink transmission subframes 54. Stated another way, a DL scheduling assignment sent in MPDCCH at subframe n is scheduling a PDSCH transmission in the same group of downlink transmission subframes. In Rel-13 of LTE it was agreed that in order to reduce processing complexity for BL/CE UEs, the DL scheduling assignment sent in MPCDCH at subframe n is scheduling a PDSCH transmission in subframe n+2. A benefit is relaxed processing effort as the time required to complete the MPDCCH decoding is larger. However, this reduces the downlink data rate because not all DL subframes are used for PDSCH transmission. In FIG. 10, subframes #0 and #1 are not used for PDSCH transmission in the first radio frame. The first DL subframe that can be used is subframe #2 which was scheduled by MPDCCH message in subframe #0. Similarly, in the second radio frame subframes #10 and #11 are not used for PDSCH transmission.

Figure 11:
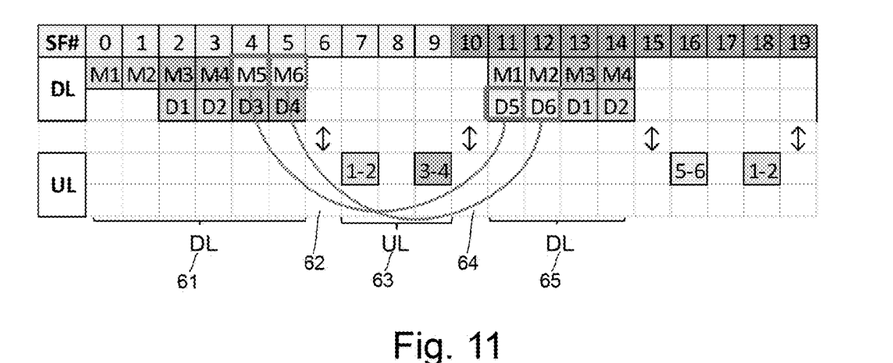
FIG. 11 shows an example of a known scheduling pattern with delayed DL grants.

FIG. 11 shows an example of a modified HD-FDD communication. In this example there is a non-uniform timing relationship between downlink data transmissions and uplink acknowledgements. Similar to FIG. 10, communication on the downlink comprises control and data. The UE receives scheduling control messages M1, M2, M3, M4 which schedule downlink data transmissions D1, D2, D3, D4 on the data channel(s). Each of the scheduling control messages M1, M2, M3, M4 precedes the downlink data transmission D1, D2, D3, D4 to which it relates, e.g. M1 precedes D1. In this example, scheduling control messages M5, M6 schedule downlink data transmissions D5, D6 on the data channel(s). The scheduling control messages M5, M6 occur in a first group of downlink transmission subframes 61 before a downlink-to-uplink guard subframe 62 and the downlink data transmissions D5, D6 occur in a second, subsequent, group of downlink transmission subframes 65 after an uplink-to-downlink guard subframe 64. This will be called delayed DL grant. The grant at M5, M6 is delayed until the next group of downlink transmission subframes 65. A guard subframe 62 at subframe 6 allows the UE to switch between DL and UL. A group of uplink subframes 63 occupy subframes #7-9. A guard subframe 64 at subframe #10 allows the UE to switch between UL and DL. Guard subframes 62, 64 and the group of uplink transmission subframes 63 separate the scheduling control messages M5, M6 and the downlink data transmissions D5, D6. This arrangement allows more (or all) of the downlink subframes to carry data. This can allow higher efficiency in the downlink subframes and/or higher downlink data rates.

Detecting Delayed DL Grant

The UE may receive an indication, such as via information received on a downlink control channel, when a data transmission is scheduled for transmission during a subsequent group of downlink transmission subframes. An indication, such as a message, or a field or a flag within a message, can explicitly tell the UE that a data transmission will occur in the next group of downlink transmission subframes. The indication can be provided as part of the scheduling control message.

Figure 6:
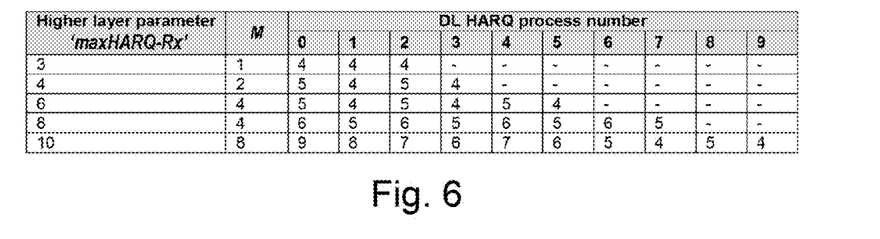
Figure 7:
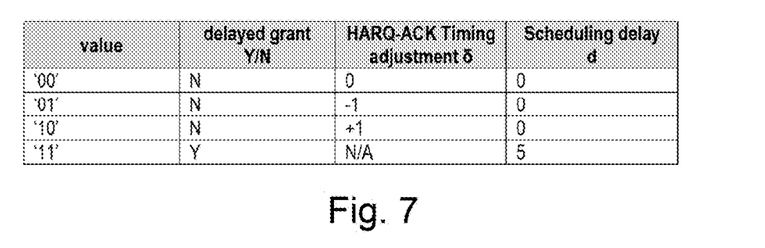

According to a first method, upon detecting a downlink assignment scheduled by MPDCCH, if the value of a field "scheduling and HARQ-ACK delay" is set to "11". An example table is shown in FIG. 6. The UE looks up the value of the field "11" and interprets this as a delayed DL grant and sets its scheduling delay to d (=5 in the example table).

According to a second method, an indicator, such as a 1-bit field indicator, is included in the DCI message. Upon detecting a downlink assignment scheduled by MPDCCH, if the value of the field Delayed downlink assignment indicator is set to 1, the UE will consider this as a delayed DL grant and set its scheduling delay to d. The value of d is known to the UE.

Timing of Scheduling (MPDCCH) and Downlink Data (PDSCH)

As described above with reference to FIG. 10, in LTE Rel-13 a scheduling message on MPDCCH in subframe n schedules a DL subframe on PDSCH in subframe n+2. With delayed DL grant this timing relationship is not kept. The UE is modified to determine a timing association between receiving a scheduling message on a control channel MPDCCH and receiving a DL data subframe on the PDSCH when delayed DL grant is used.

According to a first method, the scheduling delay between receiving a scheduling message on control channel MPDCCH and receiving a DL data subframe on the PDSCH is determined based on the location of the scheduling message with regard to the guard subframe for a DL-UL switch. If the scheduling message is received one or two subframes before a guard subframe for a DL-UL switch, the UE determines that the grant is delayed. The UE determines that the DL subframe will occur after a guard subframe for an UL-DL switch. Referring again to FIG. 11, the UE determines that a first guard subframe 62 (DL-UL switch) will occur at subframe #6 and that a second guard subframe 64 (UL-DL switch) will occur at subframe #10. The UE determines that the scheduling message M5 at subframe #4 is scheduling a delayed DL grant. The UE determines that the DL subframe D5 should be transmitted during the subframe after the second guard subframe, at subframe #11. The UE determines that the scheduling message M6 at subframe #5 is scheduling a delayed DL grant. The UE determines that the DL subframe D6 should be transmitted two subframes after the second guard subframe, at subframe #12. The UE can determine the location of the guard subframes/guard periods using the method described previously.

Stated more formally: the UE shall, upon detection of a MPDCCH with DCI format 6-1A intended for the UE in subframe n, decode the corresponding PDSCH in subframe(s) n_tag according to the MPDCCH, where:

n+1 is guard-subframe and the next guard-subframe is n_tag-2; or n+2 is guard-subframe and the next guard-subframe is n_tag-1 otherwise, n_tag =n+2.

If the time of the guard subframes is fixed (e.g. always subframes #6, #10) the method can operate without a need for the UE to receive an indication of a delayed DL grant. If the time of the guard subframes is not fixed, but implicitly determined based on HARQ-ACK timing (as described earlier) then the UE can receive an indication when a DL grant is a delayed DL grant. For example, if HARQ-ACK timing is based on HARQ process number the UE is sent a delayed DL grant indication. Referring to FIG. 11, if M1,M2 are not detected then the UE does not know that M5,M6 are delayed grants, because it does not know to invoke a guard subframe at subframe #6. Similarly, if HARQ-ACK timing based on explicit HARQ-ACK delay (method 3)—need for delayed DL grant indication—same example here.

According to a second method, the scheduling delay between MPDCCH and PDSCH is fixed to a first value for all non-delayed DL grant pairings (scheduling message, downlink subframe), and is fixed to a second value for all delayed DL grant pairings. The UE determines whether there is a delayed DL grant, and therefore determines which timing association to use. A field in the DCI may indicate whether the DL grant is a delayed DL grant or not. For example, all non-delayed DL grants may have a first scheduling delay value of 2 subframes, and all delayed DL grants may have a second scheduling delay value of 7 subframes.

Stated more formally, the method comprises:

upon detection of a MPDCCH with DCI format 6-1A intended for the UE, decodes the corresponding PDSCH in subframe(s) n+k+d according to the MPDCCH, where:

subframe n is the last subframe in which the MPDCCH is transmitted and is determined from the starting subframe of MPDCCH transmission and the DCI subframe repetition number field in the corresponding DCI; and k=2 is the second BL/CE subframe after subframe n;

d is determined based on the scheduling and HARQ-ACK delay field in the corresponding DCI as described by FIG. 6.

HARQ-ACK Timing

The timing relationship between the downlink data subframe and the HARQ-ACK is no longer a constant value for each downlink data subframe/HARQ-ACK pairing. Additionally, the timing relationship between a downlink data subframe/HARQ process and HARQ-ACK may be different at different times during a scheduling sequence. For example, in Figure B2 the downlink data D7/D8 can occur in different places with respect to guard subframes. This means the HARQ-ACK timing can vary. There are several possible ways of determining a timing relationship between a downlink data subframe and a subframe to transmit the HARQ-ACK for that downlink data subframe.

The UE may operate using one of the methods described above under "HARQ-ACK bundling". The UE may receive control information which explicitly informs the UE of a timing association. Alternatively, the UE may determine a timing association using a table of timing association information based on the HARQ ID, such as FIG. 6, and may additionally receive control information which informs the UE of a timing adjustment to make to the determined relationship.

Guard Period Determination

There are various ways of defining the timing of the guard subframes. One possibility is that the UE can determine the timing of the guard subframes by reference to downlink transmissions and scheduled uplink transmissions. Referring again to the example of FIG. 11, the UE receives a scheduling control message M4 during subframe 3 which schedules a downlink data transmission D4 during subframe 5. The UE also receives scheduling control messages M5, M6 during subframes 4, 5 which schedule downlink data transmissions D5, D6 with delayed grant, i.e. during the next group of downlink transmission subframes. The UE knows, from stored timing association data (e.g. FIG. 5) that it should transmit a HARQ-ACK reply 1-2 on the UL during subframe 7. Therefore, the UE knows that it should switch from DL to the UL during subframe 6. Similarly, the UE knows, from the stored timing association data that it should transmit a HARQ-ACK reply 3-4 on the UL during subframe 9. The UE knows this is the last HARQ-ACK reply of the transmission cycle. Therefore, the UE knows that it should switch from UL to the DL during subframe 10. The UE receives downlink data transmissions D5, D6 during subframes 11, 12.

It is possible to apply delayed DL grant to LTE HD-FDD Type A. Type A has a shortened guard period for a downlink-to-uplink switch and no guard period for an uplink-to-downlink switch. To apply delayed DL grant to Type A, references to "a guard period for a downlink-to-uplink switch" may be replaced by "a downlink-to-uplink switch" and references to "a guard period for an uplink-to-downlink switch" may be replaced by "an uplink-to-downlink switch". The UE may still determine when to perform a downlink-to-uplink switch and when to perform a downlink-to-uplink switch, without requiring a guard period between uplink and downlink subframes. The method may comprise: receiving a scheduling indication of a scheduled downlink data transmission; receiving downlink data during a downlink subframe; wherein the scheduling indication is received before a downlink-to-uplink switch and the downlink data is received after an uplink-to-downlink switch.

Figure 12:
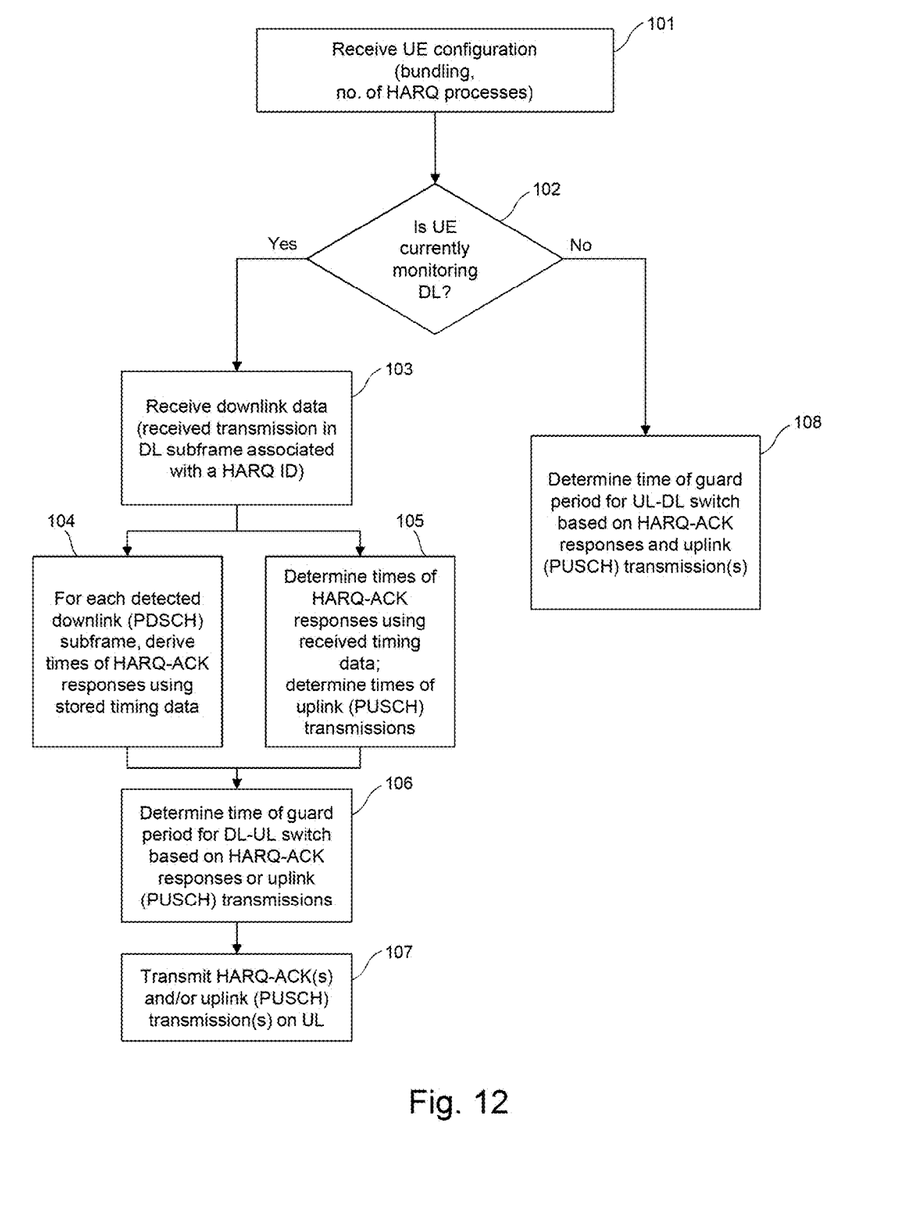
FIG. 12 shows a flow chart of a method performed by a UE.

FIG. 12 shows an example of a method performed by the UE. At block 101 the UE receives configuration information, such as a parameter configuring at least one of: HARQ-ACK bundling; a number of HARQ processes. At block 102, the UE determines if it is currently monitoring the DL. If the UE is currently monitoring the DL it proceeds to block 103. The UE receives downlink data. Downlink data received during a subframe carries a HARQ ID. The method may use block 104 or block 105. At block 104, the UE determines a time of a HARQ-ACK response for each of the received downlink data subframes using stored timing data. At block 105 the UE determines a time of a HARQ-ACK response for each of the received downlink data subframes using timing data received on a downlink control channel, such as an explicit timing indication carried in a scheduling message for the downlink transmission. The UE also determines a time of any uplink data subframes on the PUSCH.

At block 106 the UE determines a position of a guard period for a DL-UL switch based on the times of the HARQ-ACK responses and any uplink (PUSCH) transmissions. At block 107 the UE transmits a HARQ-ACK, or HARQ-ACKs on the uplink. The UE may also transmit uplink data (PUSCH) at this time. Returning to block 102, if the is not currently monitoring the DL it must be in an uplink mode. The method proceeds to block 108. At block 108 the UE determines a position of a guard period for an UL-DL switch based on the times of the HARQ-ACK responses and any uplink (PUSCH) transmissions. After all HARQ-ACK responses (and/or uplink transmissions) have been sent, the UE switches back to monitor the DL.

Figure 13:
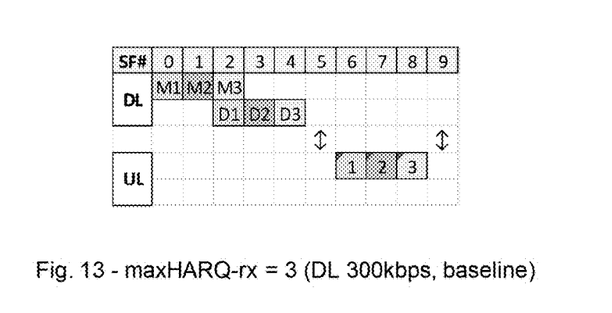
FIGS. 13 to 17 show scheduling patterns with HARQ-ACK bundling.
Figure 14:
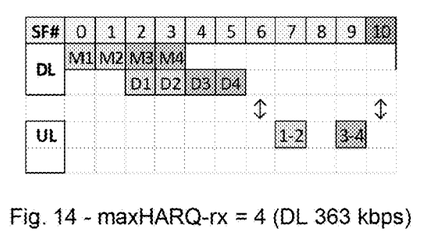
Figure 15:
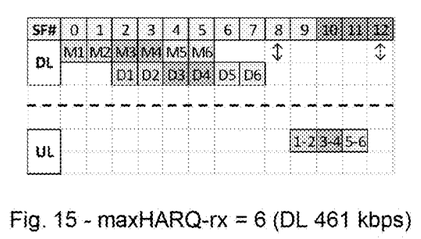
Figure 16:
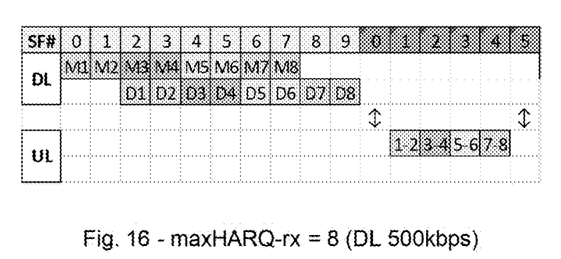
Figure 17:
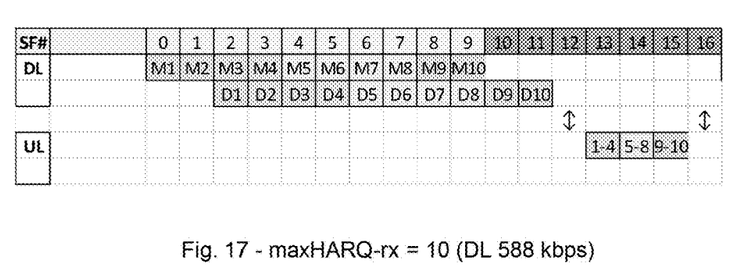

FIGS. 13 to 17 show some examples of scheduling patterns with HARQ-ACK bundling. FIG. 13 shows a conventional scheduling pattern with 3 HARQ processes and no bundling. FIG. 14 shows a scheduling pattern with 4 HARQ processes and HARQ-ACK bundling, where each HARQ-ACK response relates to two DL transmissions. FIG. 15 shows a scheduling pattern with 6 HARQ processes and HARQ-ACK bundling, where each HARQ-ACK response relates to two DL transmissions. FIG. 16 shows a scheduling pattern with 8 HARQ processes and HARQ-ACK bundling, where each HARQ-ACK response relates to two DL transmissions. FIG. 17 shows a scheduling pattern with 10 HARQ processes and HARQ-ACK bundling, where each HARQ-ACK response relates to four DL transmissions (1-4, 5-8) or to two DL transmissions (9-10).

Figure 18:
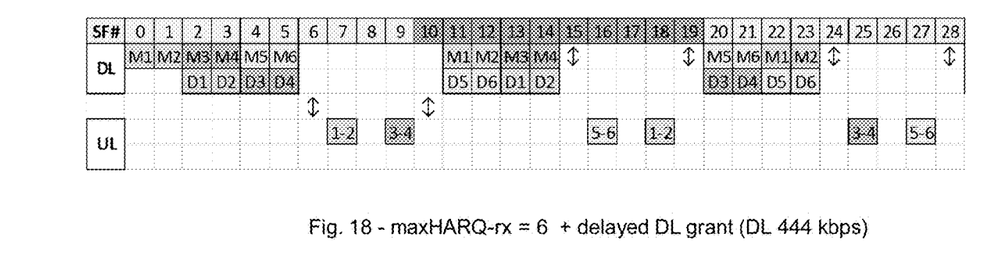
FIGS. 18 to 20 show scheduling patterns with delayed DL grants.
Figure 19:
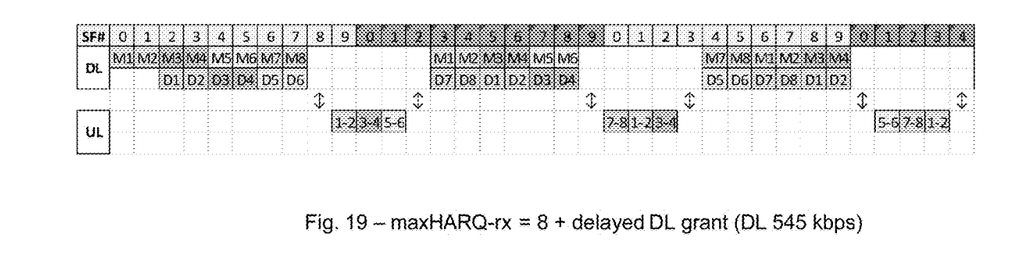
Figure 20:
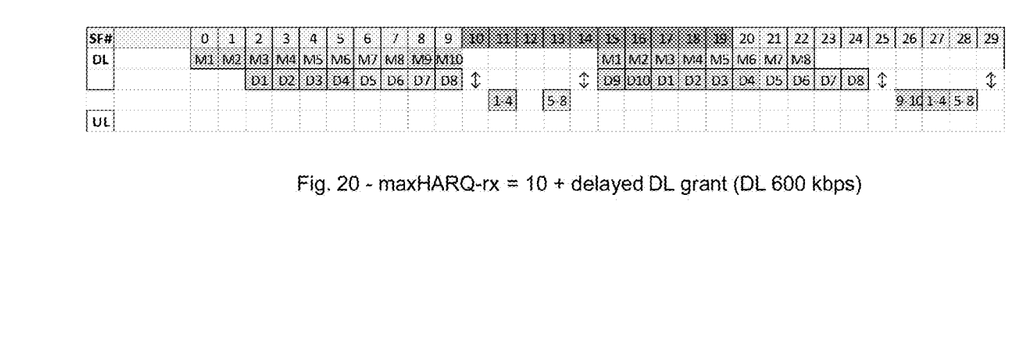

FIGS. 18 to 20 show some examples of scheduling patterns with delayed DL grants and HARQ-ACK bundling. FIG. 18 shows a scheduling pattern with 6 HARQ processes, delayed DL grants and HARQ-ACK bundling, where each HARQ-ACK response relates to two DL transmissions. FIG. 19 shows a scheduling pattern with 8 HARQ processes, delayed DL grants, and HARQ-ACK bundling, where each HARQ-ACK response relates to two DL transmissions. FIG. 20 shows a scheduling pattern with 10 HARQ processes, delayed DL grants, and HARQ-ACK bundling, where each HARQ-ACK response relates to four DL transmissions (1-4, 5-8) or to two DL transmissions (9-10).

Figure 21:
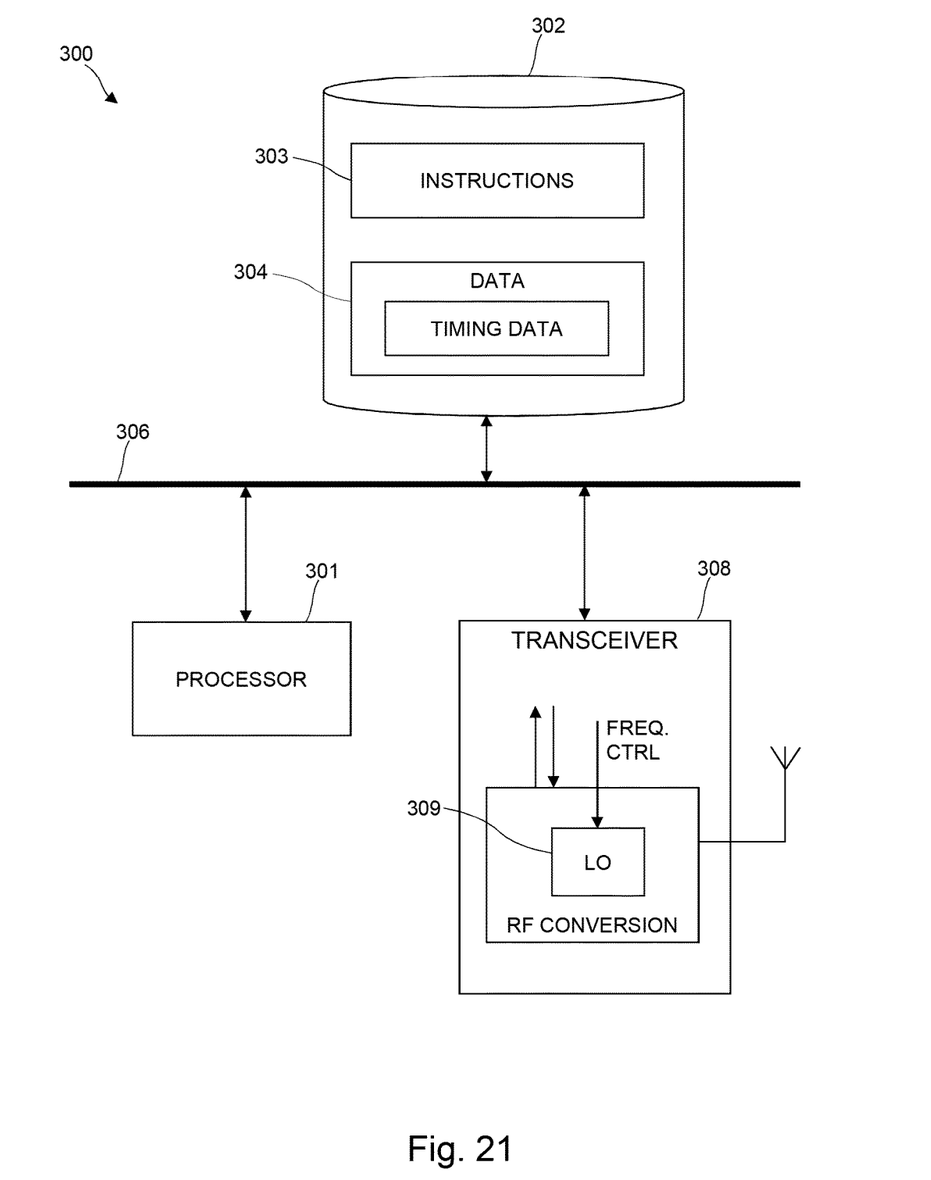
FIG. 21 schematically shows example apparatus at a UE.

FIG. 21 shows apparatus at a UE which may be implemented as any form of a computing and/or electronic device, and in which embodiments of the system and methods described above may be implemented. Processing apparatus 300 comprises one or more processors 301 which may be microprocessors, controllers or any other suitable type of processors for executing instructions to control the operation of the device. The processor 301 is connected to other components of the device via one or more buses 306. Processor-executable instructions 303 may be provided using any computer-readable media, such as memory 302. The processor-executable instructions 303 can comprise instructions for implementing the functionality of the described methods. The memory 302 is of any suitable type such as read-only memory (ROM), random access memory (RAM), a storage device of any type such as a magnetic or optical storage device. Data 304 used by the processor may be stored in memory 302, or in additional memory. Data 304 comprises timing data as described. The processing apparatus 300 comprises a wireless transceiver 308. The wireless transceiver 308 may comprise a single LO which is controllable to tune to a downlink spectral band or an uplink spectral band.

The above examples are provided by way of example only. The disclosure of this application is not restricted by the specific combination of steps shown in the figures, and described herein, but includes any appropriate subsets or combinations of steps performed in any appropriate order. Sections of the method may be performed in parallel.

The term 'user equipment' (UE) is used herein to refer to any device with processing and telecommunication capability such that it can perform the methods and functions according to the examples of the present invention. Those skilled in the art will realize that such processing and telecommunication capabilities can be incorporated into many different devices and therefore the term 'user equipment' includes mobile telephones, personal digital assistants, PCs and many other devices.

Any range or device value given herein may be extended or altered without losing the effect sought, as will be apparent to the skilled person.

The skilled person may adapt the examples for use in any telecommunication network, such as 2G, 3G, 4G, 5G or with any other telecommunication standard without losing the effect sought.

It will be understood that the benefits and advantages described above may relate to one example or may relate to several examples. The examples are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred examples is given by way of example only and that various modifications may be made by those skilled in the art. Although various examples have been described above with a certain degree of particularity, or with reference to one or more individual examples, those skilled in the art could make numerous alterations to the disclosed examples without departing from the scope of this invention.

The invention claimed is:

1. A method of wireless communication using half duplex frequency division duplex, HD-FDD, comprising at a wireless communications device:
   receiving downlink data during a plurality of downlink subframes; and
   transmitting a hybrid automatic repeat request acknowledgement, HARQ-ACK, on an uplink;
   wherein the HARQ-ACK relates to downlink data received during at least two of the plurality of downlink subframes and the HARQ-ACK is transmitted during one uplink subframe,
   wherein the wireless communications device receives timing data on a downlink channel which indicates a timing association between a downlink data subframe and an uplink transmission subframe for transmitting the HARQ-ACK,
   wherein the timing data is received as part of a downlink control indicator in a DCI message which is in DCI format 6-1A.

2. A method of wireless communication using half duplex frequency division duplex, HD-FDD, comprising performing, at a wireless base station, the steps of:
   transmitting downlink data during a plurality of downlink subframes to a mobile communications device;
   transmitting timing data on a downlink channel which indicates a timing association between a downlink data subframe and an uplink transmission subframe for transmitting the HARQ-ACK; and
   receiving a hybrid automatic repeat request acknowledgement, HARQ-ACK, on an uplink from the mobile communications device;
   wherein the HARQ-ACK relates to downlink data received during at least two of the plurality of downlink subframes and the HARQ-ACK is transmitted during one uplink subframe, wherein the timing data is transmitted as part of a downlink control indicator in a DCI message which is in DCI format 6-1A.

3. The method according to claim 1 wherein a timing association between a downlink data subframe and an uplink transmission subframe for transmitting the HARQ-ACK is non-uniform for different downlink data subframes.

4. The method according to claim 1 wherein each downlink subframe carrying downlink data is associated with an HARQ process number and wherein the wireless communications device stores timing data which indicates a timing association between an HARQ process number of the downlink data and an uplink transmission subframe for transmitting the HARQ-ACK.

5. The method according to claim 4 wherein the timing data is dependent on at least one of:
   a number of HARQ processes;
   a number of downlink data subframes that a HARQ-ACK relates to.

6. The method according to claim 1 wherein the number of HARQ processes in a transmission cycle is selected from at least one of: 3, 4, 6, 8, 10.

7. The method according to claim 1 wherein downlink subframes and uplink subframes are separated by a guard period and the method determines a timing of a guard period for a downlink-to-uplink switch by at least one of:
   determining if the timing data indicates that the wireless communications device should transmit a HARQ-ACK in a subsequent subframe;
   determining if the timing data indicates that the wireless communications device is not expected to transmit data on the uplink.

8. The method according to claim 1 wherein uplink subframes and downlink subframes are separated by a guard period and the method determines a timing of a guard period for an uplink-to-downlink switch by at least one of:
   determining if the timing data indicates that the wireless communications device is not expected to transmit a HARQ-ACK on the uplink;
   determining if the timing data indicates that the wireless communications device is not expected to transmit data on the uplink.

9. The method according to claim 1 wherein the HARQ-ACK comprises an HARQ ACK/NACK indication per HARQ process.

10. The method according to claim 1 wherein the HARQ-ACK comprises a single HARQ ACK/NACK indication for the plurality of HARQ processes.

11. A user equipment apparatus configured to perform the method of claim 1.

12. A computer program product comprising a machine-readable medium carrying non-transitory instructions which, when executed by a processor, cause the processor to perform the method of claim 1.

* * * * *